Sept. 19, 1967   B. KAISER ETAL   3,342,432
AUTOMATIC BRAKING DEVICE FOR MAGAZINE REEL
Filed Dec. 14, 1965   2 Sheets-Sheet 1
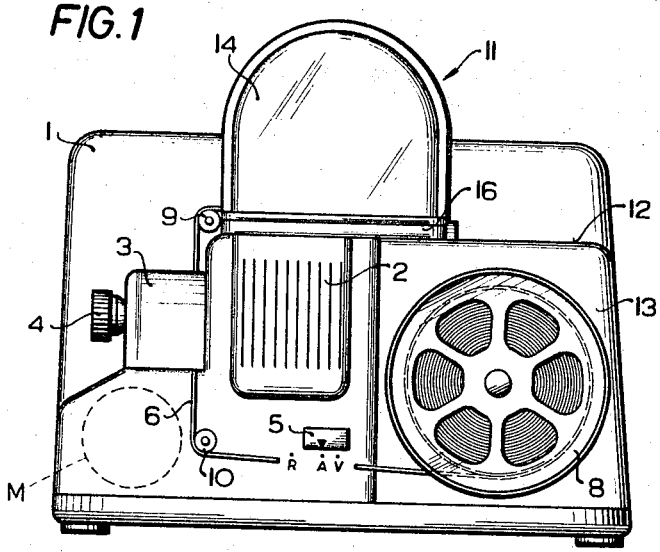
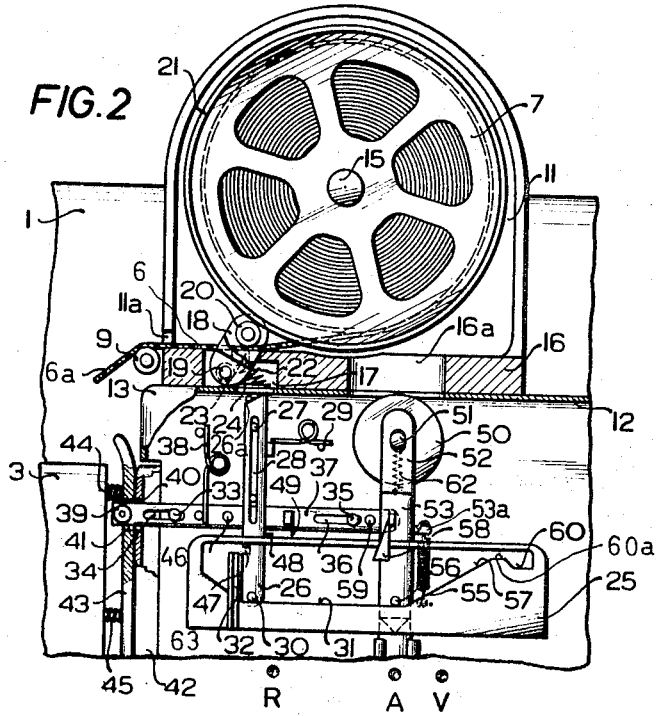
INVENTORS:
BERND KAISER
ALBERT STIERINGER
BY
Michael J. Striker
their ATTORNEYS

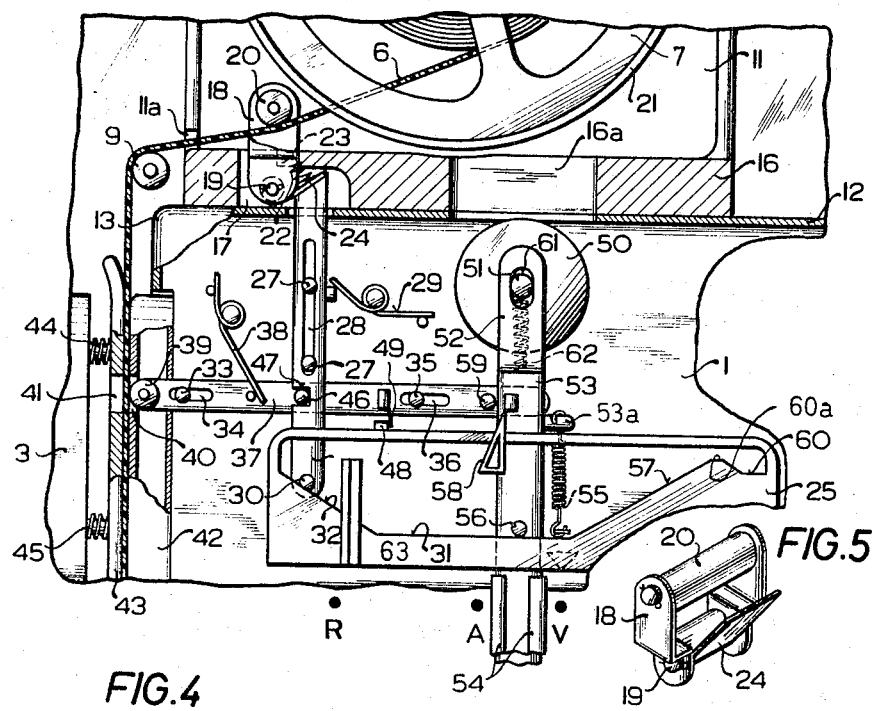
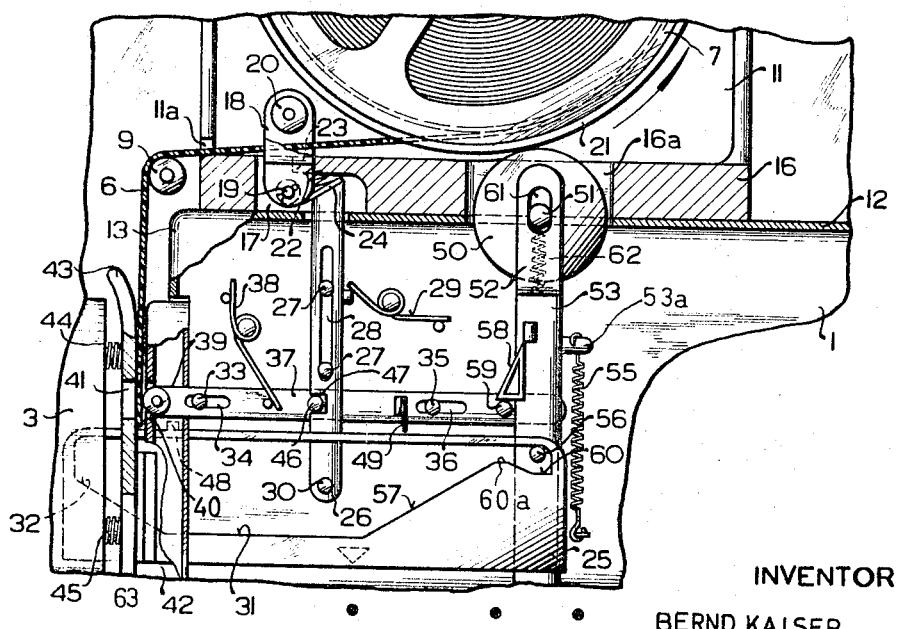

United States Patent Office 3,342,432
Patented Sept. 19, 1967

3,342,432
AUTOMATIC BRAKING DEVICE FOR
MAGAZINE REEL
Bernd Kaiser, Maichingen, and Albert Stieringer, Calmbach, Germany, assignors to Eugen Bauer G.m.b.H., Stuttgart-Unterturkheim, Germany
Filed Dec. 14, 1965, Ser. No. 513,686
Claims priority, application Germany, Dec. 17, 1964, B 79,767
17 Claims. (Cl. 242—55.13)

The present invention relates to improvements in apparatus for recording and/or reproducing intelligence which may be stored on film, tape, wire or an analogous elongated carrier capable of being convoluted onto reels, spools, rollers, drums or similar rotary supports. Still more particularly, the invention relates to movie projectors, tape recorders, movie cameras and other intelligence recording or reproducing apparatus wherein a reel of convoluted film, tape, wire or analogous carrier of intelligence is stored in a magazine and wherein such magazine is detachably mounted on or in the housing of the apparatus.

In apparatus of the class to which our present invention pertains, the carrier of intelligence (hereinafter mostly referred to as film with the understanding, however, that the invention may be resorted to with equal advantage in connection with apparatus wherein the carrier of intelligence is a sound tape or wire) is rapidly rewound on a supply reel upon completed presentation or reproduction of stored intelligence. For example, in a movie projector, forward operation during which the film is projected onto a screen is followed by rapid rewinding of film from the takeup reel onto the supply reel so that the latter may be removed, together with its magazine, to be replaced by a fresh magazine containing a reel of different film. In many heretofore known projectors, it is up to the skill of the operator to insure that the motor which transmits motion to the backwind drive is arrested in good time and preferably immediately before the leading end of the film is caused to enter into the magazine of the supply reel. By preventing entry of the leading end of the film into the interior of the magazine, the operator insures that the film is ready for the next presentation; otherwise, the magazine must be opened and the leading end of the film withdrawn which is a tedious and time-consuming operation.

Certain movie cameras which utilize two-track film are already provided with devices which automatically arrest the drive when a certain length of roll film is withdrawn from the magazine. The position of the magazine is then reversed so that the operator may expose the other half of the film. However, such arresting devices cannot be used in apparatus to which the present invention pertains, mainly because a supply reel is normally rotated by a friction drive and, when the drive is disconnected, its inertia compels the loaded supply reel to rotate for a while so that the leading end of the film is likely to be completely retracted into the magazine. The extent of rotation subsequent to disconnection of the supply reel from its friction drive depends on the dimensions of the reel (i.e., on its mass) and, therefore, it requires much skill and undivided attention to uncouple the drive at the exact moment when an optimum length of film remains accessible subsequent to complete immobilization of the supply reel in its magazine.

Certain other known proposals include the provision of a reinforced portion on convoluted film and to provide a wall of the magazine with a stop which engages the reinforced film portion so that the latter is brought to an abrupt stop. A serious drawback of such proposals is that the film is subjected to excessive tensile stresses and is likely to tear, particularly because the inertia of a loaded supply reel is considerable and, by tending to remain in a state of rotation, the reel stretches the film with a force which often exceeds a permissible value. The film will tear in or close to the region of reinforcement and its freshly formed end will fully disappear in the magazine. Furthermore, many conventional magazines for supply reels are not provided with any means for preventing uncontrolled rotation of the reel when the magazine is detached from a projector or from a movie camera.

Accordingly, it is an important object of the present invention to provide a novel braking or arresting device which may be utilized to prevent complete retraction of a film or other carrier of intelligence into the magazine of a supply reel, and to construct and assemble the braking device in such a way that the rewinding operation is automatically terminated at the exact moment when a desired length of film still extends from the magazine.

Another object of the invention is to provide a very simple, compact and rugged braking or arresting device whose operation is fully automatic, which does not subject the film or another carrier of intelligence to excessive tensional stresses, and which adds little to the bulk and/or complicatedness of the apparatus in which it is being put to use.

A further object of the invention is to provide a braking or arresting device which prevents complete retraction of a film into its magazine during rewinding onto its supply spool and which can simultaneously serve as a safety device to prevent uncontrolled retraction of film or uncontrolled rotation of the supply reel while the magazine is detached from a movie projector or from another apparatus for recording or reproducing visible and/or audible intelligence.

An additional object of the instant invention is to provide a braking or arresting device which may be activated or deactivated in automatic response to manipulation of the apparatus in which it is being used so that its braking action is insured whenever the apparatus is set for rewind operation without necessitating any attention on the part of the operator.

Still another object of our invention is to provide a movie projector which embodies the improved braking device and to provide a novel magazine for film supply reels which carries or embodies certain components of the braking device so that the latter is properly assembled in automatic response to mounting of the magazine on the projector.

A further object of the invention is to provide a novel motion transmitting connection between the actual braking member of the improved braking and arresting device and the actuating means of an intelligence recording and/or reproducing apparatus.

A more specific object of the invention is to provide a braking or arresting device whose braking action can be applied to more than a single moving part, particularly to the carrier of intelligence and to its supply reel, so that the braking action is more likely to result in immediate, fully controlled and safe immobilization of the film.

Another object of the invention is to provide a novel operative connection between the improved braking device and the drive which effects rewinding of carrier onto a supply reel which is concealed in its magazine.

An ancillary object of the invention is to provide a braking device which invariably terminates the rewinding operation at such a stage that the length of the non-retracted portion of the intelligence carrier is the same on each of a series of consecutively utilized supply reels.

Briefly stated, one feature of our present invention resides in the provision of a movie projector, movie camera, tape recorder or another apparatus for reproducing and/or recording intelligence on a film, tape, wire or other elongated carrier. The apparatus comprises a housing or another suitable support, a magazine detachably mounted on the support, a reel rotatably mounted in the magazine and arranged to accommodate a supply of convoluted carrier, an aperture provided in the magazine in such position that a length of the carrier extends therethrough, drive means mounted on or in the support for selectively rotating the reel in a direction to convolute the carrier thereon, and an automatic braking device for arresting the reel prior to complete retraction of the carrier into the magazine. The braking device comprises a braking member and means for moving the braking member to and from a braking position in which the braking member is in simultaneous frictional engagement with portions of the reel and magazine. The arrangement is preferably such that the carrier is guided between the braking member and the magazine portion so that, when moved to braking position, the braking member clamps the carrier to the magazine to simultaneously arrest the reel and the carrier. The braking member preferably comprises or consists of a roller which is rockably secured to the magazine and is biased by a spring which tends to maintain it in braking position so that the reel cannot rotate and the carrier is clamped when the magazine is detached from its support. When the roller is moved from braking position, it may serve as a guide for the carrier, i.e., the carrier is trained around a portion of the roller.

The means for moving the braking member to braking position comprises a motion transmitting unit which is mounted on or in the support, and the apparatus further comprises actuating means for operating the motion transmitting unit in response to setting of the apparatus for an operation which necessitates lengthwise movement of the carrier, e.g., for setting a movie projector for forward or rewind operation.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a somewhat schematic side elevational view of a movie projector which embodies our invention;

FIG. 2 is an enlarged fragmentary vertical section through the movie projector in a plane which is parallel to the plane of FIG. 1, and illustrates certain parts in positions they assume when the projector is turned off;

FIG. 3 is an enlarged fragmentary view of a detail of the structure shown in FIG. 2, and illustrates certain parts in positions they assume when the projector is set for forward operation;

FIG. 4 illustrates the parts of FIG. 3 in positions they assume during rewinding of film onto the supply reel; and FIG. 5 is a perspective view of a lever which supports the braking roller.

In the illustrated embodiment, the carrier of intelligence is a roll film 6 which is stored on a supply reel 7 and is about to be convoluted onto a takeup reel 8. The apparatus constitutes a movie projector and comprises a main housing or support 1 carrying a lamp housing 2 and a mount 3 for a projection lens 4. The operation of the projector is controlled by an actuating member or knob 5 which may be shifted to several positions including a first position A in which the projector is idle, a position V for forward operation when the film 6 is being taken up by the reel 8, and a position R for reverse or rewind operation to return the film back onto the supply reel 7. In other words, the motor M of the projector shown schematically in FIG. 1 will be running when the knob 5 is moved to the position V or R. In forward operation (V), the takeup reel 8 is driven by a friction clutch and draws the film 6 lengthwise off the supply reel. In reverse operation (R), the film is rapidly transported in the opposite direction and the motor M is coupled to the supply reel 7. The mechanism for guiding the film 6 between the lamp housing 2 and the projection lens 4 includes a pair of deflecting rollers 9 and 10.

Motion picture projectors, having a mechanism by means of which the film may run in opposite directions and having a single actuating member or a knob which selectively positions the mechanism for accomplishing the desired operation are well known in the art. A mechanism of this general type is disclosed in U.S. Patent 2,196,738.

The supply reel 7 is accommodated in a special magazine 11 which is removably mounted on a top wall 12 forming part of a ledge or platform 13 secured to or integral with the main housing 1. The means for detachably coupling the magazine 11 to the top wall 12 may comprise a dovetailed rail which is provided on one of the parts 11, 12 and is slidably fitted into a complementary groove provided on the other of these parts. The magazine 11 comprises a removable side wall or cover 14 and a bearing shaft 15 for the supply reel 7, and is provided with an aperture 11a for the film 6. The bottom wall 16 of the magazine 11 is formed with an opening 17 which accommodates a two-armed lever 18 best shown in FIG. 5. This lever 18 is rockable about the axis of a transverse horizontal pivot pin 19 which is journalled in the bottom wall 16. The aperture 11a is formed in the narrow front end wall of the magazine 11. One arm of the lever 18 extends into the interior of the magazine 11 and carries a braking or arresting member here shown as a roller 20 which can clamp the film 6 to the bottom wall 16 and which can also brake at least one disk-shaped flange 21 of the supply reel 7. The function of the roller 20 is to arrest the supply reel 7 upon completion of the rewinding operation and to arrest this reel in good time before the leading end 6a of the film 6 can enter the interior of the magazine 11. In carrying out its function, the roller 20 is wedged between one or both flanges 21 of the supply reel 7 and the bottom wall 16 of the magazine 11 whereby the film 6 is pressed or clamped against the bottom wall 16 in a manner as illustrated in FIG. 2.

The lever 18 is biased by a helical spring 22 which operates between a shoulder 23 of the bottom wall 16 and a lug or stop 24 of the lever 18. The shoulder 23 is provided in the opening 17. When it is free to expand, the spring 22 maintains the roller 20 in the operative or braking position of FIG. 2.

Before the projector is turned on following proper mounting of the magazine 11 on the top wall 12, the roller 20 must be rocked to the inoperative position of FIG. 3 or 4. In such inoperative position, the roller 20 is moved away from the bottom wall 16 and flanges 21 to allow for unimpeded lengthwise travel of the film 6 from the supply reel 7 to the takeup reel 8 or vice versa. The film is then trained around and is guided by a portion of the roller 20 in a manner as shown in FIG. 3. The projector comprises a motion transmitting unit which automatically rocks the roller 20 to inoperative position when the actuating knob 5 is shifted to the position V for forward operation. This motion transmitting unit includes a slide 25 which is coupled to the knob 5 and a link 26 the upper end of which is formed with an inclined end face 26a capable of engaging the lug 24 to compress the spring 22 when the link 26 moves upwardly, as viewed in FIGS. 2, 3 or 4. The link 26 is guided by a pair of fixed pins 27 which extend into an elongated slot 28 of the link and which permit the latter to move up and down, i.e., toward and away from the lug 24. Furthermore, the link 26 is biased by a torsion spring 29 which tends to move the end face 26a away from the lug 24. In such position of the link 26, its follower 30 abuts against a suitably configurated cam face 31 of the slide 25. In the illustrated embodiment, the follower 30 resembles a pin and is provided at the lower end of the link 26. The spring 29 is convoluted around a fixed stub shaft and one of its end portions bears against a projection of the link 26. The cam face 31 comprises a sloping portion 32 which can shift the follower 30 upwardly, i.e., against the bias of the springs 22 and 29, so that the end face 26a then rocks the lever 18 in a counterclockwise direction, as viewed in FIG. 2, and moves the braking roller 20 away from the bottom wall 16 and flanges 21. The upper end position of the link 26 is illustrated in FIGS. 3 and 4.

In order that the roller 20 may remain in the inoperative position of FIG. 3, the projector further comprises a locking mechanism which insures that the roller 20 remains spaced from the parts 16 and 21 after the knob 5 is shifted from the position V to the position A or R. The locking mechanism is constructed and assembled in such a way that it automatically releases the link 26 when the rewinding operation is almost completed, i.e., when the leading end 6a of the film 6 approaches the aperture 11a of the magazine 11. In the illustrated embodiment, the locking mechanism comprises a reciprocable locking bolt 37 having a pair of elongated slots 34, 36 for two fixed pins 33, 35 serving to guide the bolt 37 in directions substantially at right angles to the longitudinal extension of the link 26. In the idle position of FIG. 2, the bolt 37 is free to follow the bias of a retracting spring 38 and keeps its locking pin 46 away from a recess 47 in the link 26. The forward or left-hand end of the bolt 37 carries a tracking or scanning roller 39 which is in contact with the rear side of the film 6 when the projector is operated in reverse so that the knob 5 assumes the position R and the film is being convoluted onto the supply reel 7. When the film 6 is not yet attached to the core of the takeup reel (see the leading end 6a of the film in FIG. 2), the forward end of the locking bolt 37 (and the scanning roller 39) extends through a pair of registering cutouts or passages 40, 41 provided in two guide walls 42, 43 serving to guide the film toward the film gate. The guide wall 43 is located in front of the guide wall 42 and is biased by suitable springs and is guided by a pair of rods 44, 45 which are parallel with the optical axis of the lens 4. Such mounting of the guide wall 43 enables an upstanding arm 63 carried by the slide 25 to move this wall forwardly and away from the guide wall 42 when the knob 5 is moved to the position R so as to permit for convenient rewinding of the film. The arm 63 is disengaged from the front guide wall 43 when the knob is moved to a position other than R.

The locking pin 46 of the bolt 37 will enter the recess 47 of the link 26 when the knob 5 assumes the position V after the link reaches the upper end position of FIG. 3. The means for shifting the bolt 37 to the active position of FIG. 3 or 4 comprises a motion transmitting projection or stud 48 on the slide 25 which can bear against a short leaf spring 49 secured to a median portion of the locking bolt. The locking pin 46 can be withdrawn from the recess 47 only when the scanning roller 39 is again free to enter the registering passages 41 and 42, i.e., when the leading end 6a of the film has moved upwardly and beyond the passages 41, 42. As soon as these passages are free for entry of the scanning roller 39, the spring 38 immediately shifts the locking bolt 37 back to the inactive position of FIG. 2 and the link 26 is then free to move downwardly as long as its follower 30 is not engaged by the sloping portion 32 of the cam face 31.

The drive which rotates the supply reel 7 in a direction to withdraw the film from the takeup spool 8 comprises a friction wheel 50 which is coupled to the motor M in a manner well known from the art of movie projectors and not shown in the drawings. When it is coupled to and drives the supply reel 7, the friction wheel 50 extends into and partially through a cutout or window 16a in the bottom wall 16 of the magazine 11. The shaft 51 of the friction wheel 50 is journalled with clearance in a bifurcated end portion 52 of a holder 53 which is guided in ways 54 shown in the lower part of FIG. 3 and is movable up and down, namely, in directions at right angles to the directions in which the slide 25 is reciprocable by the knob 5. A spring 55 is coupled to a pin 53a of the holder 53 and tends to shift the latter downwardly, as viewed in FIGS. 2 to 4 so that a follower pin 56 of the holder bears against the cam face 31 of the slide 25. This cam face 31 is provided with a second sloping portion 57 which is arranged to shift the holder 53 when the knob 5 is moved to the position R whereby the friction wheel 50 enters the window 16a and engages the flanges 21 to rotate the supply reel 7 in a counterclockwise direction and to convolute the film 6 onto the core of this reel. The holder 53 further supports a resilient blocking pawl 58 which can engage a blocking pin 59 of the locking bolt 37 to thereby hold the friction wheel 50 in engagement with the flanges 21. The purpose of the pawl 58 and pin 59 is to block the holder 53 in its raised or effective position and to thereby maintain the wheel 50 in engagement with the flanges 21 of the supply reel 7. The blocking action of the parts 58, 59 is terminated in a fully automatic way when the rewinding operation is completed, i.e., when the leading end 6a of the film 6 moves to the position of FIG. 2 and is located between the aperture 11a and the passage 41.

When the knob 5 is shifted to the rewind position R, the follower pin 56 of the holder 53 is located opposite a short horizontal portion 60 of the cam face 31. This portion 60 is separated from the sloping cam face portion 57 by a lobe 60a which enables the slide 25 to raise the holder 53 sufficiently so that the blocking pawl 58 may engage the pin 59. Once the pawl 58 has engaged the pin 59, the follower 56 remains in its upper end position and is spaced from the horizontal cam face portion 60 when the slide 25 is moved all the way to the end position of FIG. 4, i.e., when the knob 5 assumes the position R.

The shaft 51 of the friction wheel 50 is guided in slots 61 provided in the bifurcated end portion 52 of the holder 53. Two helical expansion springs 62 are inserted into the bifurcated portion 52 and tend to move the shaft 51 upwardly so that the peripheral surface of the wheel 50 is under bias at the time it is caused to engage the flanges 21 of the supply reel 7.

The operation of the projector is as follows:

In forward operation, i.e., when the knob 5 is shifted from the position A to the position V in order to project images onto a screen, the magazine 11 is supported by the platform or ledge 13 in a manner as shown in FIGS. 1 to 4. The film 6 must be threaded through the guide mechanism and must be manually connected with the core of the takeup reel 8. Alternatively, the projector may be of the self-threading type. While the knob 5 moves from the position A to the position V, the slide 25 shifts the sloping portion 32 of its cam face 31 against the follower 30 to move the link 26 upwardly against the bias of the springs 22 and 29 whereby the braking roller 20 is rocked away from the bottom wall 16 of the magazine 11 and from the flanges 21 of the supply reel 7. During such upward movement of the link 26, its inclined end face 26a engages the lug 24 and rocks the lever 18 in a counterclockwise direction, namely, from the position of FIG. 2 into the position of FIG. 3. Thus, the roller 20 releases the film 6 which, up to such movement of the knob 5, was clamped against the upper side of the bottom wall 16.

While the slide 25 follows the movement of the knob 5 to the position V, its projection 48 engages the spring 49 and shifts the locking bolt 37 from the position of FIG. 2 to the position of FIG. 3 whereby the bolt 37 overcomes the bias of the spring 38 and the locking pin 46 enters the recess 47 to thus retain the link 26 in its raised position. The scanning roller 39 is retracted from the passages 40 and 41 so that the space between the guide walls 42, 43 is free to permit introduction of the film 6. In the next step, the leading end 6a of the film 6 is threaded through the space between the guide walls 42, 43 to such an extent that the claw pull-down (not shown) of the film transporting mechanism enters the perforations of the film 6 and can effect further advance of the film toward the takeup reel 8 because the motor M is running. The operation of the claw pull-down is well known in the art and forms no part of the present invention. This claw pull-down can advance the film in stepwise fashion. The threading mechanism for the film normally comprises a suitable channel which guides the film toward the reel 8. In a further step, the leading end 6a is manually attached to the core of the reel 8 (in certain projectors, such attachment can take place in a fully automatic way) which is provided with a suitable catcher (not shown) to grip the leading end 6a. When the projection of images on the film 6 is completed so that the major part of the film is stored on the takeup reel 8, the knob 5 is shifted back to the position A to arrest the motor M and the slide 25 moves the sloping portion 32 of its cam face 31 away from the follower 30 at the lower end of the link 26. However, the link 26 remains in its raised position because the recess 47 still accommodates the pin 46 of the locking bolt 37. The bolt 37 is disengaged from the stud 48 of the slide 25 but remains in the locking position of FIG. 3 because the film 6 prevents entry of the scanning roller 39 into the passage 41 of the front guide wall 43.

In order to rewind the film 6 onto the supply reel 7, the operator shifts the knob from the position A to the position R (i.e., in a direction counter to that when the knob moves to the position V). Such movement of the knob 5 causes the slide 25 to move to the position of FIG. 4 whereby the sloping portion 57 of the cam face 31 engages the follower pin 56 and moves the holder 53 to the raised position in which the friction wheel 50 enters the window 16a and is drivingly coupled with the flanges 21 of the supply reel 7. Such movement of the holder 53 is opposed by the spring 55 and in part by the springs 62 which urge the wheel 50 against the flanges 21 with a yieldable force. The blocking pawl 58 snaps behind the pin 59 and retains the holder 53 in the raised position of FIG. 4 so that the friction wheel 50 can rotate the reel 7 in a counterclockwise direction. During movement to the position R, the knob 5 also shifts the guide wall 43 away from the guide wall 42 so that the film 6 is free to travel through the space between the two guide walls.

Upon completion of the rewinding operation, the leading end 6a (now actually the trailing end because the film 6 advances away from the takeup reel 8) moves past the passages 40, 41 and allows the scanning roller 39 to enter the passage 41 in the front guide wall 43. The spring 38 is then free to release its energy and holds the locking bolt 37 in the position of FIG. 2 so that the locking pin 46 is withdrawn from the recess 47 and the link 26 descends under the bias of the springs 22 and 29. The pin 59 moves away from the pawl 58 and the spring 55 is free to retract the holder 53 from its upper end position so that the friction wheel 50 is uncoupled from the flanges 21 of the supply reel 7. At the same time, the spring 22 rocks the lever 18 in a clockwise direction and wedges the braking roller 20 between the flanges 21 and the bottom wall 16 of the magazine 11 so that the roller 20 brakes the supply reel 7 and simultaneously clamps the film 6 against the bottom wall 16. Such braking action of the roller 20 rapidly brings the reel 7 to a full stop, invariably before the leading end 6a can be retracted through the aperture 11a and into the interior of the magazine 11. The follower 56 then abuts against the horizontal portion 60 of the cam face 31 and allows the friction wheel 50 to remain disengaged from the flanges 21. The projector preferably comprises a switch (not shown) which is actuated by the holder 53 when the latter is free to follow the bias of the spring 55, i.e., when the pawl 58 is disengaged from the pin 59 and the follower 56 moves from the position of FIG. 3 to the position of FIG. 4. The switch opens the circuit of the motor M so that the friction wheel 60 is arrested. The knob 5 is then returned to the position A and the magazine 11 can be detached from the platform 13. The position of the braking roller 20 remains unchanged because the lever 18 is biased by the spring 22 so that the film 6 is positively clamped against the bottom wall 16 as long as the magazine remains disconnected from the platform. This means that the film 6 cannot be accidentally withdrawn from the reel 7.

When the spring 22 is free to expand and to propel the braking roller 20 into actual engagement with the flange or flanges 21 of the supply reel 7 and with the film 6, the flanges still tend to rotate due to inertia and cause the roller 20 to increase its braking action because the roller is actually wedged into the substantially triangular space between the reel 7 and the bottom wall 16. The same holds true for the action of the film 6, i.e., as the film 6 still travels in a direction toward the reel 7, it tends to entrain the roller 20 against the adjoining portions of the flanges 21 so that the film also contributes to deeper penetration of the roller into the space between the flanges and the bottom wall 16. It was found that such dual wedging action upon the roller 20 contributes to very rapid immobilization of the supply reel without subjecting the film to excessive tensional stresses.

Since the roller 20 remains in its operative or braking position when the magazine 11 is detached from the platform 13, it insures that the film 6 cannot be accidentally withdrawn from the magazine as well as that the leading end 6a cannot be retracted into the interior of the magazine where the film could form loops.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an apparatus for reproducing and/or recording intelligence on an elongated carrier, a support; a magazine detachably mounted on said support; a reel rotatably mounted in said magazine and arranged to accommodate a supply of convoluted carrier, said magazine having an aperture through which the carrier extends; drive means mounted on said support for rotating said reel in a direction to convolute the carrier thereon; and an automatic braking device for arresting said reel prior to complete retraction of the carrier into said magazine, including a braking member and means for moving said braking member to and from a braking position in which said member is in simultaneous engagement with portions of said reel and said magazine.

2. A structure as set forth in claim 1, wherein the carrier is guided between said braking member and said portion of said magazine so that, in said braking position thereof, the braking member clamps the carrier to said magazine.

3. A structure as set forth in claim 2, wherein said braking member is movably secured to said magazine and wherein the means for moving the braking member to said braking position comprises resilient means arranged to maintain said member in braking position when the magazine is detached from said support.

4. A structure as set forth in claim 2, wherein the means for moving said braking member from braking position comprises a motion transmitting unit mounted on said support and further comprising actuating means for operating said unit in response to setting of the apparatus for an operation which necessitates lengthwise movement of the carrier.

5. A structure as set forth in claim 4, wherein said actuating means comprises a movable actuating member arranged to select a plurality of different operations of the apparatus including a forward operation during which the carrier is being withdrawn from said reel, and wherein said motion transmitting unit is operative to move the braking member from said braking position when said actuating member selects said forward operation.

6. A structure as set forth in claim 5, further comprising locking means mounted on said support for locking said motion transmitting unit in operative position, said locking means being arranged to release said unit in automatic response to completed convolution of the carrier onto said reel, and an operative connection between said locking means and said actuating member for operating said locking means to lock said unit in operative position in response to selection of an operation other than said forward operation.

7. A structure as set forth in claim 6, wherein said locking means comprises spring-biased scanning means spaced from said aperture and arranged to track the carrier during convolution onto said reel and to initiate disengagement of said locking means from said motion transmitting unit when the end of the carrier moves past said scanning means toward said aperture.

8. A structure as set forth in claim 5, wherein said actuating member is movable to a rewind position and further comprising an operative connection between said actuating member and said drive means for coupling the drive means with said reel in response to movement of said actuating member to rewind position.

9. A structure as set forth in claim 8, further comprising means for uncoupling said drive means from said reel in response to movement of said braking member to braking position.

10. A structure as set forth in claim 9, wherein said drive means comprises a friction wheel and said operative connection comprises a movable holder supportingly connected with said wheel, cam means movable by said actuating member, follower means provided on said holder for tracking said cam means, resilient means for urging said holder in a direction to uncouple said wheel from said reel, and blocking means for blocking the holder in a position in which said wheel is coupled with said reel in response to displacement of said holder by said cam means, said uncoupling means comprising scanning means arranged to track the carrier while the carrier is being convoluted onto said reel and to disengage said blocking means so that the wheel is uncoupled from the reel by said resilient means when the carrier moves beyond said scanning means.

11. A structure as set forth in claim 2, wherein said braking member is a roller and further comprising a lever rockably mounted in said magazine and supporting said roller, said moving means including resilient means for biasing said lever in a direction to wedge said roller between said portions.

12. A structure as set forth in claim 11, wherein the carrier is trained around and is guided by a portion of said roller when the latter is moved from said braking position.

13. A structure as set forth in claim 2, wherein said reel comprises a pair of disk-shaped flanges and wherein said braking member bears against at least one of said flanges when moved to said braking position.

14. A structure as set forth in claim 2, wherein said carrier is a roll film and said apparatus is a movie projector.

15. A structure as set forth in claim 1, wherein said magazine comprises a bottom wall having a window through which a portion of said drive is movable into driving engagement with said reel, said braking member being movable into frictional engagement with said bottom wall and with at least one flange of said reel.

16. A structure as set forth in claim 1, wherein said moving means comprises components mounted in part on said magazine and in part on said support.

17. A structure as set forth in claim 1, wherein said drive means comprises a rotary member movable into and from frictional engagement with said reel and further comprising actuating means for controlling the operation of said braking means and of said drive means in such a way that said reel can be engaged by one of said members at a time.

References Cited

UNITED STATES PATENTS 3,169,721  2/1965  Laa et al. _____ 242—55.13
3,254,856  6/1966  Camras _____ 242—55.13

FRANK J. COHEN, *Primary Examiner.*

G. F. MAUTZ, *Assistant Examiner.*